United States Patent [19]

Ford

[11] Patent Number: 5,000,989

[45] Date of Patent: Mar. 19, 1991

[54] FINE PARTICLE-SIZE POWDER COATING SUSPENSION AND METHOD

[75] Inventor: Cheryl A. Ford, Byfield, Mass.

[73] Assignee: GTE Products Corporation, Danvers, Mass.

[21] Appl. No.: 544,078

[22] Filed: Jun. 26, 1990

Related U.S. Application Data

[63] Continuation of Ser. No. 453,338, Dec. 19, 1989, abandoned, which is a continuation of Ser. No. 62,263, Jun. 12, 1987, abandoned.

[51] Int. Cl.$^5$ .............................................. B05D 3/02
[52] U.S. Cl. .................................. 427/387; 106/197.1; 106/287.23; 106/287.34; 427/67; 427/397.7; 427/230; 524/44
[58] Field of Search ...................... 427/67, 230, 397.7, 427/387; 106/287.34, 197.1, 287.23; 524/44

[56] References Cited

U.S. PATENT DOCUMENTS

| | | | |
|---|---|---|---|
| 4,088,802 | 5/1978 | Shriver | 427/67 |
| 4,148,935 | 4/1979 | Shreurs | 427/67 |
| 4,340,512 | 7/1982 | Shreurs | 427/67 |
| 4,344,016 | 4/1982 | Hoffman et al. | 427/67 |

OTHER PUBLICATIONS

*The Condensed Chemical Dictionary*, 6th ed., N.Y., Reinhold, 1961, p.

*Primary Examiner*—Janyce Bell
*Attorney, Agent, or Firm*—Martha Ann Finnegan

[57] ABSTRACT

A coating suspension including negatively charged fine particles, water, a negative charge precursor, a defoaming agent, a surface active agent, an insolubilizing agent, a plasticizer, and two water-soluble binders is provided. In a preferred embodiment the fine particles are fine particle-size silica. There is also provided a method for coating a substrate with fine particles having a negative electrical charge. The method includes forming a coating suspension including the fine particles, water, a negative charge precursor, a defoaming agent, a surface active agent, an insolubilizing agent, a plasticizer, and two water-soluble binders; applying the coating suspension to the surface of the substrate to form a coated substrate; and heating the coated substrate to cure the coating and remove the water from the suspension. The coating formed is insoluble in water and water based media.

15 Claims, 1 Drawing Sheet

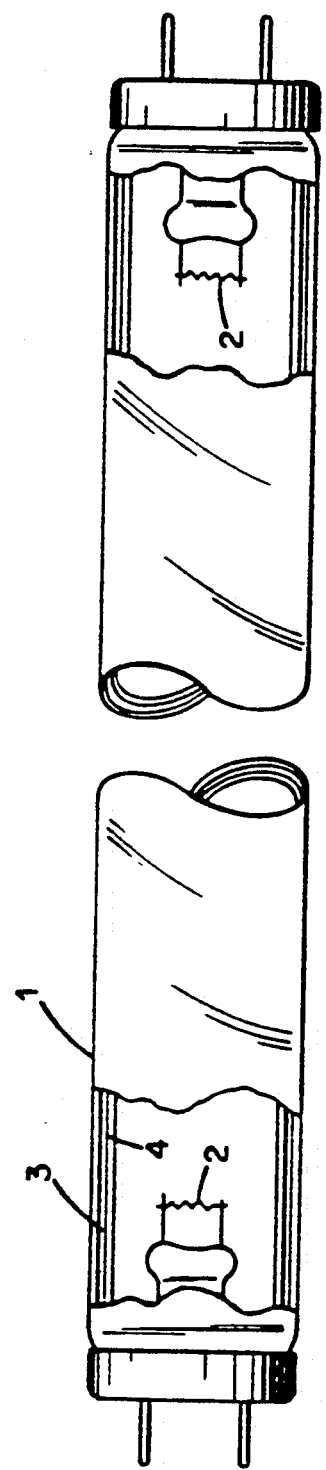

FINE PARTICLE-SIZE POWDER COATING SUSPENSION AND METHOD

This is a continuation of copending applications Ser. No. 07/453,338, filed on Dec. 19, 1989, now abandoned. This is a continuation of co-pending application Ser. No. 07/062,263, filed on Jun. 12, 1987, now abandoned.

TECHNICAL FIELD OF THE INVENTION

The present invention relates to coatings and more particularly to coatings including fine particle-size powders.

SUMMARY OF THE INVENTION

In accordance with the present invention there is provided a coating suspension comprising fine particles having a negative charge, water, a negative charge precursor, a defoaming agent, a surface active agent, an insolubilizing agent, a plasticizer, and two water-soluble binders.

In accordance with another aspect of the present invention there is provided a method for coating a substrate with fine particles having a negative charge, the method comprising forming a coating suspension comprising fine particles having a negative charge, water, a negative charge precursor, a defoaming agent, a surface active agent, an insolubilizing agent, a plasticizer, and two water-soluble binders; applying the coating suspension to the surface of the substrate to form a coated substrate; and heating the coated substrate to cure the coating and remove the water from the suspension.

In accordance with still another aspect of the present invention there is provided a coating suspension comprising fine particle-size silica, water, a negative charge precursor, a defoaming agent, a surface active agent, an insolubilizing agent, a plasticizer, and two water-soluble binders.

In accordance with yet another aspect of the present invention there is provided a method for coating a substrate with fine particle-size silica, the method comprising forming a coating suspension comprising fine particle-size silica, water, a negative charge precursor, a defoaming agent, a surface active agent, an insolubilizing agent, a plasticizer, and two water-soluble binders; applying the coating suspension to the surface of the substrate to form a coated substrate; and heating the coated envelope to cure the coating and remove the water from the suspension.

BRIEF DESCRIPTION OF THE DRAWINGS

In the drawings:

The FIGURE is an elevational view of a fluorescent lamp, in partial cross-section, including a fine particle-size silicon dioxide layer applied to the envelope in accordance with the present invention.

For a better understanding of the present invention, together with other and further objects, advantages, and capabilities thereof, reference is made to the following disclosure and appended claims in connection with the above-described drawings.

DETAILED DESCRIPTION

In accordance with the present invention, there is advantageously provided a coating suspension and method for applying fine particles having a negative charge, such as fine particle-size silica, to the surface of a substrate which eliminates the need to bake the coated substrate before a second coating is applied thereover.

As used herein, "fine particles" and "fine particle-size" refers to particles having an average particle size of less than or equal to about 200 nm.

The coating suspension and method of the present invention produces a layer of fine particles having a smooth, uniform texture. The present coating suspension and method further inhibits flaking away of the coating when thick coatings, e.g., greater than about 2.5 mg/cm$^2$, are applied. Such flaking is experienced when thick coatings are applied using an organic base suspension.

The coating suspension of one embodiment of the present invention comprises fine particle-size silica, water, a negative charge precursor, two water-soluble binders, a defoaming agent, a surface active agent, an insolubilizing agent, and a film-plasticizing agent.

The coating suspension is applied to the surface to be coated by allowing the suspension to flow over the substrate surface or by other known techniques. The coated substrate is then heated at a temperature and for a period of time sufficient to remove the water and to cure the coating. The resulting cured coating is insoluble when contacted with an aqueous medium.

More particularly, the fine particle-size silica coating suspension is prepared by mixing a fine particle-size silica with deionized water, a negative charge precursor, for example, an aqueous base such as ammonium hydroxide, a defoaming agent, a surface active agent, an insolubilizing agent, and a plasticizer to form a slurry. Two water soluble binders are also added to the slurry. Preferably, the two water soluble binders are added to the slurry in solution form.

A preferred pair of water soluble binders for use in the present invention are hydroxyethylcellulose and poly(ethylene oxide). When these preferred water-soluble binders are used, the hydroxyethylcellulose concentration is selected such that the film applied to the envelope is not soluble in the coating suspension used to apply a second coating during a subsequent coating step. (The use of a second coating is optional.) Preferably, the concentration is at least about 1 weight percent based on the weight of the fine particle-size silica. Most preferably, the concentration is from about 1 to about 1.2 weight percent based on the weight of the silica. At higher concentrations, the solution can become too viscous requiring additional water to be added thereby lowering the amount of fine particle-size silica which can be deposited on the surface being coated.

The use of a single binder, such as hydroxyethylcellulose, does not provide uniform distribution of silica on the inner surface of the lamp envelope. An acceptable film texture is characterized by tightly packed silica particles uniformly distributed on the inner surface of the lamp envelope so as to provide a smooth uninterrupted film.

Advantageously, the further inclusion of a second water-soluble binder, such as poly(ethylene oxide) solution produces a smooth film. The concentration of poly(ethylene oxide) in the coating suspension is selected to produce a smooth film. The inclusion of poly(ethylene oxide) in an amount of at least 8.8% based on the weight of the fine particle-size silica produces an acceptable film texture.

For example, the use of 8.8% poly(ethylene oxide) based upon the weight of fine particle silica in the coating suspension, deposits a layer containing about a 3.0 g fine particle-size silica on a substrate having an approximate surface area of 1335 cm². Thinner films with as little as 300mg of silica can be obtained by diluting the fine particle coating suspension with additional poly (ethylene oxide) solution with no effect on the insolubility of the coating as long as 1.0% hydroxyethylcellulose based on the silica weight was present in the coating suspension.

The insolubilizing agent is a material which effects cross-linking of the binders during a low-temperature (e.g., below 300° C.) heating step which renders the fine particle coating insoluble. The weight ratio of the insolubilizing agent to hydroxyethylcellulose in the coating suspension is at least 0.5. Preferably, the ratio is in the range of 0.5-1.0. At ratios below 0.5, the coating film does not attain film insolubility. An example of a preferred insolubilizing agent is dimethylolurea.

The plasticizer concentration, based on the weight of the silica, is preferably at least about 2% and most preferably from about 2 to about 3%. Below about 2%, pinholing can occur after the application of the phosphor coat. Above 3%, coating defects, particularly mottling, are possible. An example of a preferred plasticizer is glycerine.

The concentration of the negative charge precursor is preferably greater than or equal to about 0.05 moles per 100 grams (g) fine particle-size silica and most preferably greater than or equal to about 0.05 to about 0.091 moles per 100 g of the silica. The introduction of negative ions reduces the thickening properties of the negatively charged fine particle-size silica. In amounts below about 0.05 moles per 100 g silica, the coating suspension may be too viscous to apply as a coating. In amounts in excess of about 0.091 moles per 100 g silica, the negative charge precursor provides little additional lowering of the viscosity of the suspension. For example, when an aqueous base such as $NH_4OH$ is used as the negative charge precursor, in an amount of about 0.05 to about 0.091 moles of $NH_4OH$ per 100 g silica, the viscosity of the fine particle size-silica coating suspension is lowered from 35-40 "viscosity (viscosity without the ammonium hydroxide) to 16-20" viscosity (with ammonium hydroxide) measured by the Sylvania Cup.

The viscosity number given herein is the number of seconds required to empty a special cup, referred to herein as the Sylvania Cup, filled with the material being measured, and having a one-eighth inch diameter hole at the center of its bottom, through which the material may flow. The cup is made from a nickel crucible having an inside diameter, at its top, of 1.5 inches. Such a crucible has a flat bottom, which has been rounded out for the present purpose so that the overall inside length from the top of the cup to the bottom is 1 ⅜ inches. The cup holds 33 cc of liquid when filled to the top.

The defoaming agent and surfactant (also referred to herein as a "surface active agent") can be any such materials conventionally employed in coating-solution technology. Such materials are well known in the art. Preferably the concentration of the defoaming agent is at least 0.01% and most preferably greater than 0.025% and less than 0.04%, based upon the volume of the coating suspension. The concentration of the surfactant is preferably at least 0.001% and most preferably greater than 0.0025% and less than 0.004%, based upon the volume the coating suspension.

The concentration of the fine particle-size silica in the coating suspension is preferably less than or equal to about 150 grams per liter (g/l) of coating suspension, and most preferably from about 40 g/l to about 132 g/l of coating suspension. At concentrations less than 40 g/l little silica will be deposited on a substrate; and at concentrations above 150 g/l non-uniform films may occur.

The following is exemplary of the preparation of a substrate coated with a layer of fine particle-size silica in accordance with the present invention, and is not to be construed as necessarily limiting thereof.

EXAMPLE

A coating suspension in accordance with the present invention was prepared from the following components mixed together in the order as listed:

| | |
|---|---|
| 150 cc | deionized water |
| 12 cc | ammonium hydroxide Reagent Grade Assay (28-31) |
| 0.28 cc | defoaming agent (Hercules type 831) |
| 0.028 cc | surfactant (BASF type 25R-1 Pluronic) |
| 2.5 cc | glycerine |
| 0.45 g | dimethylolurea |
| 150 g | Aerosil$^R$ OX-50 (obtained from DeGussa, Inc.) |
| 100 cc | hydroxyethylcellulose solution containing 1.7 weight percent of the resin (Natrosol (HEC) grade 250 MBR obtained from Hercules) in water |
| 600 cc | poly (ethylene oxide) solution containing 2.2 weight percent of the resin (WSRN 2000 obtained from Union Carbide) in water |

The substrate used in the present example was the inner surface of a 40 watt T12 fluorescent lamp glass envelope of circular cross-section.

An insoluble fine particle-size silica coating was applied to the inner surface of the fluorescent lamp envelope by causing the above-described suspension to flow down the inner wall of the envelope while being held in a vertical position.

After allowing the bulb to drain for a sufficient period of time, e.g., for 30 seconds, the coated tube was placed in an air drying chamber maintained at a temperature of 230° F. for 30 minutes to remove the water and complete the cross linking reaction between the two water-soluble resins and the insolubilizing agent, dimethylolurea.

The preceding Example formulation allowed about 2.5-3.0 grams of Aerosil ®OX-50 to be deposited on the inner surface of the standard 40T12 fluorescent lamp envelope.

The dried fine particle-size silica coated bulb was allowed to cool to room temperature, following which the fine particle-size silica layer was overcoated with water-base 3K° Royal White tri-phosphor suspension by known techniques. The double coated bulb was baked at about 600° C. for 2 minutes to remove the organic components of the binders. The coated envelope was then processed into a fluorescent lamp by conventional lamp manufacturing techniques.

The FIGURE illustrates a fluorescent lamp including a fine particle-size silica layer and an overlying phosphor layer. Referring to the FIGURE with more particularity, the illustrated fluorescent lamp comprises an elongated glass, e.g., soda lime silica glass, envelope 1 of circular cross-section. It has the usual electrodes 2 at each end of the envelope 1 supported on lead-in wires.

The sealed envelope, or tube, is filled with an inert gas, such as argon or a mixture of inert gases, such as argon and neon, at a low pressure, for example 2 torr; and a small quantity of mercury is added, at least enough to provide a low vapor pressure of, for example, about six (6) microns during operation.

The inner surface of the tubular glass envelope is first coated with a fine particle-size layer 3 and an overlying layer 4 of the desired phosphor.

While the FIGURE and foregoing example are directed to coating the inner surface of a fluorescent lamp envelope, the coating suspension and method of the present invention can be used to coat any impervious water-insoluble substrate regardless of configuration.

The silica used in the above-described experiments and tests was Aerosil ® OX-50 obtained from DeGussa, Inc. Aerosil ® OX-50 is a fluffy white powder and has a BET surface area of $50 \pm 15$ m$^2$/g. The average primary particle size of OX-50 is 40 nm. Aerosil ® OX50 contains greater than 99.8 percent $SiO_2$, less than 0.08 % $Al_2O_3$, less than 0.01% $Fe_2O_3$, less than 0.03 $TiO_2$, less than 0.01% HCl, and less than 0.1% sieve residue. (OX-50 has a tamped density of approximately 130 g/l).

Although the foregoing Example is directed to a coating suspension and method involving fine particle-size silica, the coating suspension and method of the present invention is also suitable for use with any fine particles (i.e., having an average particle size less than or equal to about 200 nm) having a negative charge, i.e., particles that move to the positive pole in an aqueous dispersion.

While there have been shown and described what are considered preferred embodiments of the present invention, it will be apparent to those skilled in the art that various changes and modifications may be made therein without departing from the invention as defined by the appended claims.

What is claimed is:

1. A coating suspension comprising fine particle-size silica, water, a negative charge precursor, a defoaming agent, a surface active agent, an insolubilizing agent, a plasticizer, and two water-soluble binders, said two water soluble binders comprising hydroxyethylcellulose and poly (ethylene oxide).

2. A coating suspension in accordance with claim 1 wherein said negative charge precursor is an aqueous base.

3. A coating suspension in accordance with claim 1 wherein the concentration of hydroxyethylcellulose in said coating suspension is at least 1 weight percent based upon the weight of fine particle-size silica in said coating suspension.

4. A coating suspension in accordance with claim 3 wherein the concentration of said poly (ethylene oxide) in said coating suspension is at least 8.8% based upon the weight of fine particle-size silica in said coating suspension.

5. A coating suspension in accordance with claim 4 wherein the weight ratio of the insolubilizing agent to hydroxyethylcellulose in the coating suspension is at least 0.5;1 the concentration of said plasticizer, based on the weight of fine particle-size silica, is about 2 to about 3 weight percent; and the concentration of the negative charge precursor is greater than or equal to about 0.051 moles per 100 grams of fine particle-size silica.

6. A coating suspension in accordance with claim 1 wherein the concentration of said fine particle size silica less than or equal to about 150 grams per liter of coating suspension.

7. A coating suspension in accordance with claim 1 wherein said insolubilizing agent is dimethylolurea.

8. A coating suspension comprising:
deionized water;
fine particle size silica in a concentration less than or equal to about 150 grams per liter of coating suspension;
a negative charge precursor in a concentration of at least about 0.05 moles per 100 grams of fine particle-size silica;
a defoaming agent in a concentration of at least 0 01%;
a surfactant in a concentration of at least 0.001%;
a plasticizer in a concentration of at least 2 weight percent based on the weight of fine particle-size silica;
a first water soluble binder comprising hydroxyethylcellulose, said first water soluble binder having a concentration in said coating suspension of at least 1 weight percent based upon the weight of fine particle-size silica in said coating suspension;
a second water soluble binder comprising poly(ethylene oxide), said second water soluble binder having a concentration in said coating suspension of at least 8.8 weight percent based upon the weight of fine particle-size silica in said coating suspension; and
an insolubilizing agent in a weight ratio of the insolubilizing agent to said first water soluble binder of at least 0.5.

9. A coating suspension comprising:
deionized water;
fine particle size silica in a concentration greater than or equal to 40 and less than or equal to 132 grams per liter of coating suspension;
a negative charge precursor comprising ammonium hydroxide in a concentration from about 0.05 to about 0.09 moles per 100 grams of fine particle-size silica;
a defoaming agent in a concentration from about 0.01%;
a surfactant in a concentration from about 0.001%;
a plasticizer in a concentration of from 2 weight percent based on the weight of fine particle-size silica;
a first water soluble binder comprising hydroxyethylcellulose, said first water soluble binder having a concentration in said coating suspension of from about 1 to about 1.2 weight percent based upon the weight of fine particle-size silica in said coating suspension;
a second water soluble binder comprising poly (ethylene oxide), said second water soluble binder having a concentration in said coating suspension of at least 8.8 weight percent based upon the weight of fine particle-size silica in said coating suspension; and
an insolubilizing agent comprising dimethylolurea in a weight ratio of the insolubilizing agent to said first water soluble binder of from 0.5 to 1.0.

10. A coating suspension in accordance with claim 9 wherein said plasticizer comprises glycerine.

11. A method for coating a substrate with fine particle-size silica, said method comprising:
forming a coating suspension comprising fine particle-size silica, water, a negative charge precursor, a defoaming agent, a surface active agent, an insolubilizing agent, a plasticizer, and two water soluble binders, said two water soluble binders comprising hydroxyethylcellulose and poly (ethylene oxide);

applying the coating suspension to the surface of the substrate to form a coated substrate; and heating the coated substrate to cure the coating and remove the water from the suspension.

12. A method in accordance with claim 11 wherein said coating suspension comprises:

deionized water;

fine particle size silica in a concentration less than or equal to 150 grams per liter of coating suspension;

a negative charge precursor in a concentration of at least about 0.05 moles per 100 grams of fine particle-size silica;

a defoaming agent in a concentration of at least 0.01%;

a surfactant in a concentration of at least 0.001%;

a plasticizer in a concentration of at least 2 weight percent based on the weight of fine particle-size silica;

a first water soluble binder comprising hydroxyethylcellulose, said first water soluble binder having a concentration in said coating suspension of at least 1 weight percent based upon the weight of fine particle-size silica in said coating suspension;

a second water soluble binder comprising poly(ethylene oxide), said second water soluble binder having a concentration in said coating suspension of at least 8.8 weight percent based upon the weight of fine particle-size silica in said coating suspension; and an insolubilizing agent in a weight ratio of the insolubilizing agent to said first water soluble binder of at least 0.5;

13. A method in accordance with claim 11 wherein said heating is conducted at a temperature less than about 300° C.

14. A coating suspension comprising fine particles having a negative charge, water, a negative charge precursor, a defoaming agent, a surface active agent, an insolubilizing agent, a plasticizer, and two water-soluble binders, said two water soluble binders comprising hydroxyethylcellulose and poly (ethylene oxide).

15. A method for coating a substrate with fine particles having a negative charge, said method comprising:

forming a coating suspension comprising fine particles having a negative charge, water, a negative charge precursor, a defoaming agent, a surface active agent, an insolubilizing agent, a plasticizer, and two water-soluble binders, said two water soluble binders comprising hydroxyethylcellulose and poly (ethylene oxide);

applying the coating suspension to the surface of the substrate to form a coated substrate; and heating the coated substrate to cure the coating and remove the water from the suspension.

* * * * *